UNITED STATES PATENT OFFICE.

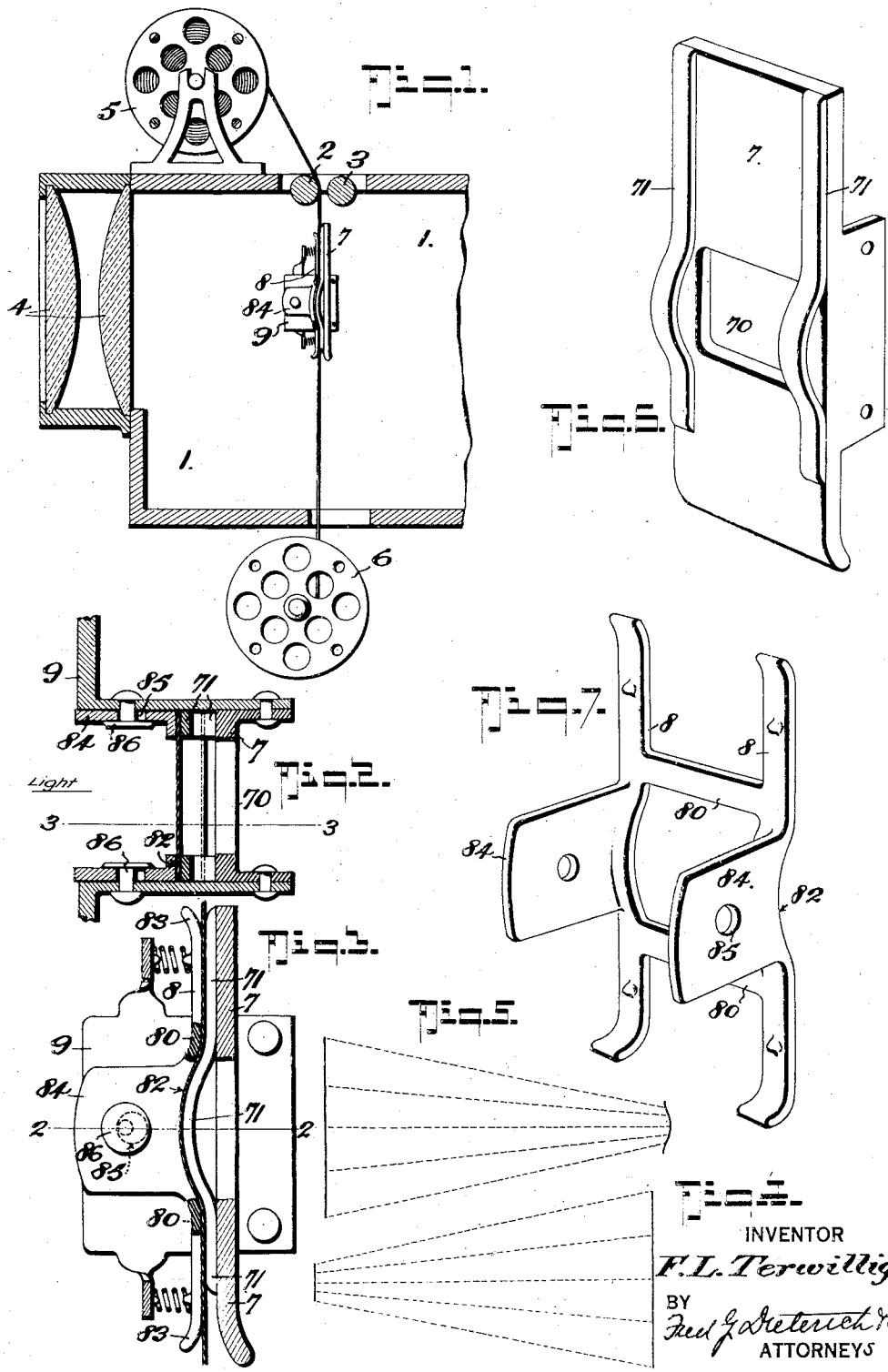

FRANK L. TERWILLIGER, OF KLAMATH FALLS, OREGON, ASSIGNOR OF ONE-HALF TO THADDEUS G. McHATTAN, OF KLAMATH FALLS, OREGON.

MOTION-PICTURE-PROJECTING MACHINE.

1,256,613.   Specification of Letters Patent.   Patented Feb. 19, 1918.

Application filed February 7, 1917. Serial No. 147,083.

*To all whom it may concern:*

Be it known that I, FRANK L. TERWILLIGER, of Klamath Falls, in the county of Klamath and State of Oregon, have invented certain new and useful Improvements in Motion - Picture - Projecting Machines, of which the following is a specification.

This invention has reference to improvements in moving picture projecting apparatus and it more particularly has for its purpose to provide a simple, and inexpensive attachment for the conventional types of picture projecting apparatus, which, when operatively applied, tends to maintain a proper focusing of the film and in such manner that the projected picture is shown on the screen uniformly sharp from the center to the outer edges thereof.

As is well known to those skilled in the art to which this invention relates, when passing the film flatwise across the aperture in the plate through which the picture is projected, the distance lines or lines of focus from the opposite ends of the aperture to the screen are of greater length than the lines of focus from the center of the aperture to the screen, hence, resulting in sharper lines of the picture at the center of the screen than at its outer edges.

In order to properly focus the film and produce, as it were, a uniform sharpness of the picture upon the screen, I have provided an improved attachment applicable to the ordinary types of apertured projecting plates, for causing the film to present a convex contour the full width of the opening at the optical axis, whereby to render all distance lines projected from the film of uniform length and at the same time so guide the film that the danger of the curved portion of such film, warping or buckling, is prevented during the operation of passing the film over the projecting opening.

This invention also has for its purpose, to provide in an attachment of the character stated for moving picture machines, means for holding the film under a limited tension as it passes along over the projecting plate, to thereby maintain the said film in proper shape for assuming the convexed form and under relatively rigid condition when passing the projecting opening.

With other objects in view that will hereinafter appear, this invention embodies the peculiar features of construction and novel combination of parts, all of which will be first described in detail, specifically pointed out in the claims and illustrated in the accompanying drawing, in which:

Figure 1 is a longitudinal section of so much of a moving picture apparatus as is necessary to illustrate a practical application of this invention.

Fig. 2 is a detail horizontal section thereof on the line 2—2 on Fig. 3.

Fig. 3 is a vertical section thereof taken on the line 3—3 on Fig. 2.

Fig. 4 is a diagram that illustrates the relative lengths of the distance lines of the picture projected through a film that passes flatwise across the opening.

Fig. 5 is a similar view that shows the distance lines as projected from a film shaped in accordance with this invention.

Fig. 6 is a detail perspective view of the apertured plate with my arrangement of film tracks.

Fig. 7 is a similar view of the tension device that coöperates with the said guides for holding the moving film from warping or buckling along its curved portion.

In the drawing, 1 designates a casing of a moving picture apparatus, 4 the condenser lenses, 5 the upper or film supply roll, 2—3 the film guide rolls, located above the apertured plate 7 over which the film passes and from which it extends down through the bottom of the casing to the take-up roll 6, the several parts so far described being shown to illustrate the practical application of this invention which will now be explained in detail, it being understood that any suitable means are included in the apparatus for advancing the film.

Referring now more particularly to Figs. 2, 3, 6 and 7, it will be noticed that the apertured plate 7 has the usual elongated aperture 70 and in my construction it has film tracks 71—71 along the opposite edges and such portions of the said tracks in transverse alinement with the aperture 70 are curved outwardly in the longitudinal plane of the tracks to form convexed surfaces relatively to the aperture 70, to provide a uniform backwardly curved or convexed film portion with respect to the said aperture 70, as is clearly shown in Fig. 5, by reference to which it will be seen that by reason of drawing back the film on a uniform or convexed line, all of the light lines that are projected onto the screen are of uniform length from the center to the opposite edges of the said screen and hence a uniform sharpness of the picture, across the screen at all points thereof, is obtained.

It should be stated that in my means for projecting light lines of equal distances, the film is curved in the longitudinal plane to the line of movement of the film and maintains its relative flat face relation to the plate aperture over which it passes To obtain the best results and keep the film in its uniform flat face relation and under such rigidity that side buckling or warping thereof, as it passes between the condenser and the apertured plate, is prevented, a spring tension device is provided for engaging the film under such conditions that it holds the film against warping or buckling and yet provides for the required free feeding or movement of the film, as it passes from the supply roll to the take-up devices.

For this purpose, I have provided a pressure frame that consists of opposite parallel side members 8 of resilient metal, which are held spaced apart by upper and lower cross members 80—80.

The side members 8 are so spaced as to close against the opposite film edges that move along the film tracks and, at the plate aperture, each member 8 is concaved, as at 82, to register with the convexed portions of the said track, and to provide against possible injury to the film edges, the upper and lower ends of the members 8 are gradually curved outwardly, as at 83.

The said pressure frame, formed of resilient metal, is rockably mounted upon a suitable support 9, the said frame having rearwardly projected ears 84—84 that are fulcrumed, as at 85, on studs 86, held in alinement with the central horizontal axis of the opening 70.

By reason of providing a spring tension device for holding the film against buckling or warping, as stated, the said device, while at all times operating to keep the film perfectly smooth, free of warps or irregular face surfaces, accommodates itself to intermittent interruptions of the film movement and irregular longitudinal strains on the film, as it feeds from the supply roll.

My invention is exceedingly simple in its construction and is of such a character that it may be readily applied to the conventional types of moving picture apparatus without the necessity of any material changes therein.

What I claim is:

1. In an apparatus for moving pictures; means for presenting the film in a uniform convexed surface at the optical axis and in a longitudinal plane to the movement of the said film, and means for holding the film against buckling or warping at such convexed surface, said means consisting of a resilient rockable frame adapted for being held in engagement with the opposite or track edges of the film.

2. In an apparatus for moving pictures; means for presenting the film in a uniform convexed surface at the optical axis and in a longitudinal plane to the movement of the said film, and means for holding the film against buckling or warping at such convexed surface, the said means consisting of a resilient frame adapted for being held in engagement with the opposite or track edges of the film, the said resilient frame being mounted to rock in the direction of its length and fulcrumed in alinement with the central horizontal axis of the opening in the projecting plate.

3. As a new article, a picture projecting means comprising an apertured plate having film tracks along its opposite edges, the said tracks including convexed portions in transverse alinement with the aperture in the plate and in a longitudinal plane to the line of movement of the film and a flexible tension device for holding the opposite edges of the film against the film tracks under tension.

FRANK L. TERWILLIGER.